N. E. HESTON.
CLUTCH.
APPLICATION FILED AUG. 9, 1910.
982,605.
Patented Jan. 24, 1911.
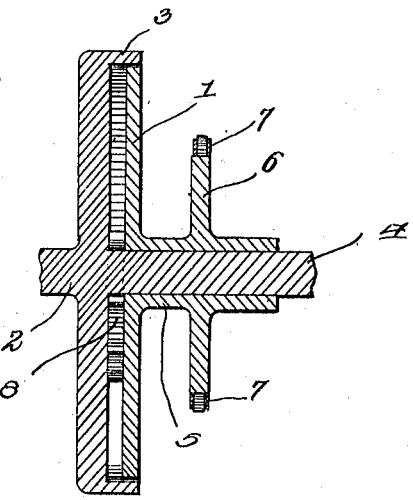
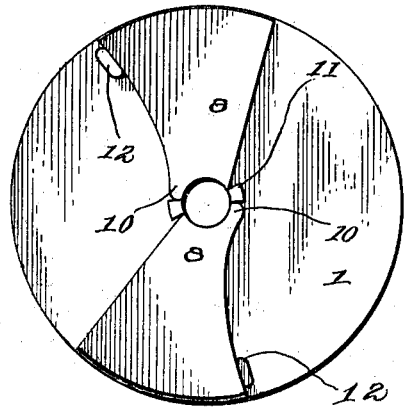
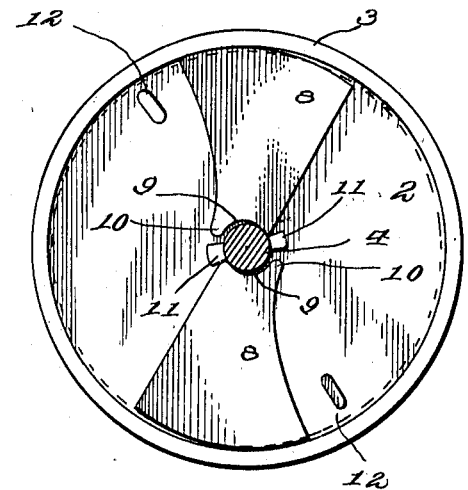
Witnesses
Frederick L. Foe.
V. B. Hillyard.
Inventor
Nathan E. Heston,
By Victor J. Evans
Attorney

UNITED STATES PATENT OFFICE.

NATHAN E. HESTON, OF ALEXANDRIA, NEBRASKA.

CLUTCH.

982,605.  Specification of Letters Patent.  Patented Jan. 24, 1911.

Application filed August 9, 1910. Serial No. 576,386.

*To all whom it may concern:*

Be it known that I, NATHAN E. HESTON, a citizen of the United States, residing at Alexandria, in the county of Thayer and State of Nebraska, have invented new and useful Improvements in Clutches, of which the following is a specification.

The present invention provides a clutch of novel structure for general use requiring an intermittent gripping action such as resulting from a ratchet movement.

The clutch is specially designed for manual operation for transmitting movement from a crank or like manually operable part to a mechanism to be actuated by a step-by-step or intermittent movement.

A further purpose of the invention is the provision of a clutch which may be adapted for starting internal combustion engines or for imparting movement to any mechanism either to supplement the driving power thereof or to give an initial movement thereto or which clutch may be used solely as the power transmitting means for converting an oscillatory movement into a continuous rotary movement.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a sectional view of a clutch embodying the invention. Fig. 2 is a face view of the operating disk with the dogs in position. Fig. 3 is a side view of the driven disk, showing the shaft in section and the dogs and stops coöperating therewith in working position.

Corresponding and like parts are referred to in the following description, and indicated in all the views of the drawing, by the same reference characters.

The clutch comprises two members 1 and 2, the former being the operating disk and the latter the driven disk. The driven disk has a rim or annular flange projecting from one side to extend over the outer edge of the operating disk 1. A shaft 4 has the driven disk 2 secured thereto whereby both the shaft and disk rotate together. The shaft 4 transmits power from the clutch to the mechanism or part to be operated.

The operating disk 1 is loose upon the shaft 4 and has a sleeve 5 rotatable therewith, said sleeve being adapted to have the power applied thereto either directly or indirectly according to the adaptation and specific use for which the clutch is designed. As shown a sprocket wheel 6 is secured to the sleeve 5 and power is intermittently applied thereto by means of a sprocket chain 7. The operating disk 1 is adapted to be actuated by means of a crank, not shown, thereby admitting of the clutch being manually operable so that it may be advantageously used for starting internal combustion engines or for driving mechanisms adapted to be actuated by a ratchet mechanism from a manual application of power. Dogs 8 are mounted upon the operating disk 1 and are adapted to frictionally engage the inner wall of the rim or annular flange 3. Any number of dogs 8 may be employed, two usually being sufficient and arranged diametrically opposite each other. The dogs are of tapered form, being contracted at their inner ends and widened at their outer ends, which latter conform to the curvature of the rim or flange 3 so as to engage the same throughout the extent of the outer end of the dog. The inner ends of the dogs are cut away, as indicated at 9, to conform to the curvature of the draft 4 and the end portion is extended, as at 10, to coöperate with a stop projecting laterally from the operating disk so as to hold the dog out of operation upon turning the operating disk in one direction.

Two stops 11 project through the inner side of the operating disk 1 and are adapted to engage the extensions 10 of the dogs 8. The stops 11 are located at opposite points and engage the inner corners of the dogs, one of said stops forming a point of resistance for one of the dogs to force the same outward into engagement with the rim or flange 3 upon turning the disk 1 in one direction and the other stop serving to hold the dog in given position whereby it is enabled to ride upon the flange 3 when turning the disk 1 in an opposite direction. Other stops 12 project from the disk 1 near its outer edge and serve to limit the movement of the dogs in one direction and to hold the same in position when out of engagement with the rim or flange 3 upon turning the operating disk 1 in a direction to move the outer stops 12 away from the dogs. The latter are pressed upon at their inner rear corners by the inner stops 11, with the result that the outer forward corner portions of the dogs are thrown outward into frictional engagement with the inner wall or rim of the flange 3, thereby gripping the same and causing the two disks 1 and 2 to rotate together. Upon turning the disk 1 backward the outer forward corner portions of the dogs are drawn inward, thereby releasing the rim or flange 3 and permitting the disk 1 to turn backward preliminary to again rotating the same forward to impart a rotary movement to the disk or member 2. When the disk 1 is turned backward the dogs 8 release their hold upon the rim or annular flange 3 by the tendency of the same to move inward. When the disk 1 is turned forward the stops 11 engage the inner rear corners of the dogs, thereby throwing the outer forward corner portions of the dogs outward into frictional engagement with the rim or flange 3 and causing both the operating and driven disks to move forward together.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A clutch comprising a disk adapted to have power intermittently applied thereto, said disk having a laterally extending rim or annular flange, an operating disk mounted concentric with the first mentioned disk, inner and outer stops extending laterally from the operating disk toward the first mentioned disk, and a dog mounted between the two disks and tapered from its inner end outward, the latter being formed on the arc of a circle corresponding to the inner circumference of the aforesaid rim or annular flange, and the inner end of the dog being cut away and having an extension at its inner forward corner, said dog having its outer forward and its inner rear corner portions adapted to engage respectively the said outer and inner stops.

2. A clutch comprising a driven disk having a lateral rim or annular flange, an operating disk mounted concentric with the driven disk and adapted to have an oscillatory movement imparted thereto, inner and outer stops projected laterally from the operating disk, and tapered dogs arranged between the two disks and having their inner ends cut away and formed at their inner forward corners with extensions, said inner stops being arranged to come between the inner ends of the dogs and the outer stops adapted to engage the outer forward corner portions of the dogs.

In testimony whereof I affix my signature in presence of two witnesses.

NATHAN E. HESTON.

Witnesses:
F. A. JACQUES, Jr.,
CHAS. I. MOORE.